United States Patent [19]
Roberts

[11] Patent Number: 4,777,715
[45] Date of Patent: Oct. 18, 1988

[54] TOOL SHANK RETENTION MECHANISM WITH MACHINE TOOL THEREFOR

[76] Inventor: William C. Roberts, 2400 Elden Ave. Apt. #13, Costa Mesa, Calif. 92627

[21] Appl. No.: 925,941

[22] Filed: Oct. 31, 1986

[51] Int. Cl.⁴ .................... B23Q 3/157; B23C 5/26
[52] U.S. Cl. ............................ 29/568; 408/239 A; 409/233
[58] Field of Search ............ 29/568, 26 A; 409/233; 408/239, 239 A, 240; 74/424.8 B

[56] References Cited

U.S. PATENT DOCUMENTS

| | | | |
|---|---|---|---|
| 3,277,568 | 10/1966 | Wetzel | 29/568 |
| 3,516,149 | 6/1970 | Mickas | 29/568 |
| 3,709,623 | 1/1973 | Stephan | 29/568 |
| 3,825,245 | 7/1974 | Osburn | 269/30 |
| 3,986,617 | 10/1976 | Blomquist | 29/563 |
| 4,090,287 | 5/1978 | Selander | 29/568 |
| 4,175,898 | 11/1979 | Wood | 409/233 |
| 4,196,506 | 4/1980 | Reed | 29/568 |
| 4,199,286 | 4/1980 | Kirkham | 409/233 |
| 4,369,563 | 1/1983 | Williamson | 29/568 |

OTHER PUBLICATIONS

Macminery's Handbook, 21st Ed., 3rd Printing (1980); See Tables 1,2 & 3 on pp. 1740–1741, 1742, 1743, & p. 1727.

Tool Engineers Handbook, 1st Ed., 1st Printing (1949), Am. Soc. of Tool Engineers; See p. 1854.

Primary Examiner—Z. R. Bilinsky
Attorney, Agent, or Firm—John L. Hummer

[57] ABSTRACT

A simple, strong and fast acting tool retention subsystem is intended for both original equipment and retrofit applications in machining centers with automatic tool changer systems. A machining center incorporating the invention is described. The invention is compatible with ANSI standards for spindles, tapered tool shanks and knobs, and is configured to eliminate the tool chatter and tool shank taper unseating and release commonly occurring in conventional spring actuated tool retention subsystems when spiral fluted cutters are used. The tool shank is positively jam locked by a rotary bolt actuator means that generates a very high value of axial pre-load tension, comparable to that which was furnished by the very successful historic manual draw-in bolt retention subsystem used in milling machines. A bi-directional free wheeling impact motor drives the rotary bolt actuator means between open and closed positions of a maximally strong collet. Positive seating of the tool shank in the spindle nose taper is assured by the extremely high pre-load tension applied to the knob, which is supplied by the mechanical strain of the steel of the jam locked mechanism and the supporting spindle structure. Thus the tool retention is limited only by the yield strength of the materials and not by the bias of any coil or belleville spring, as is the current practice in the machining center industry.

23 Claims, 6 Drawing Sheets

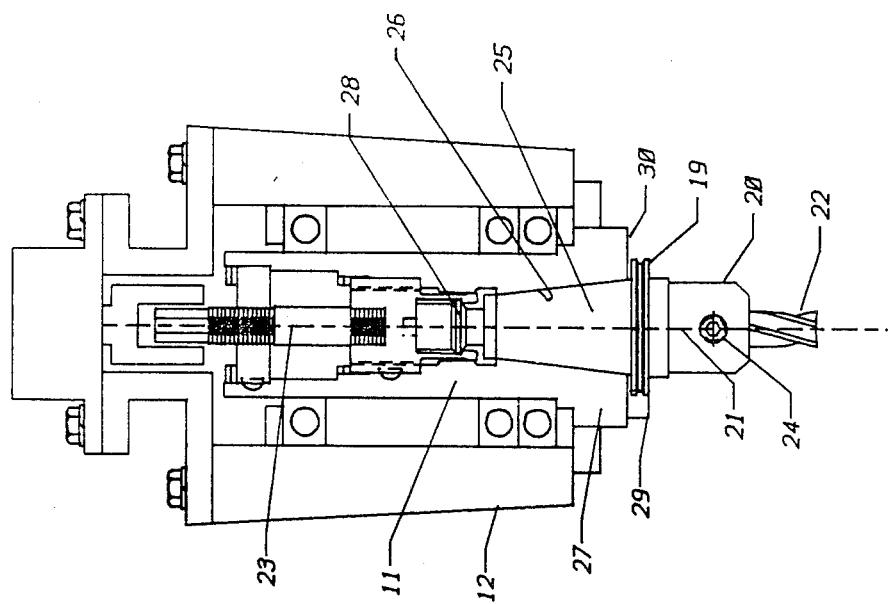
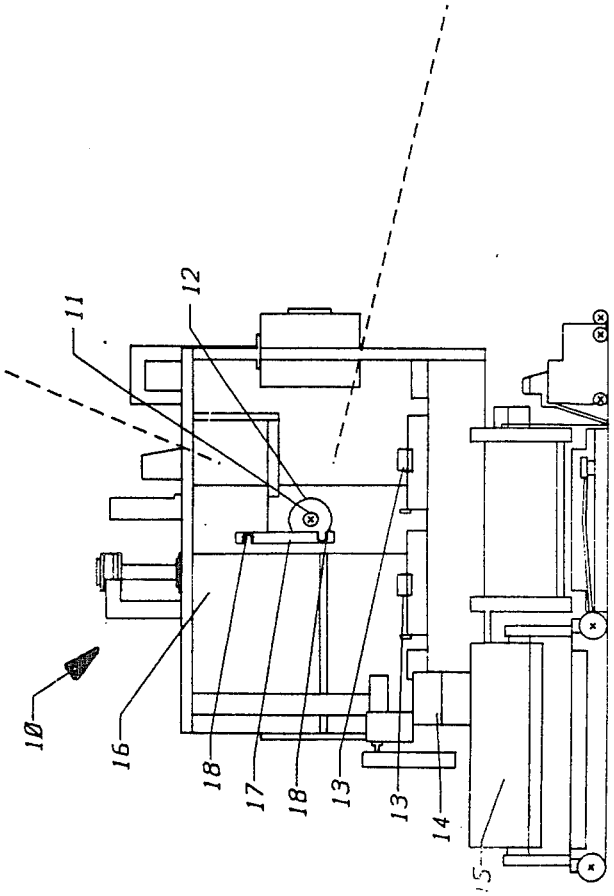

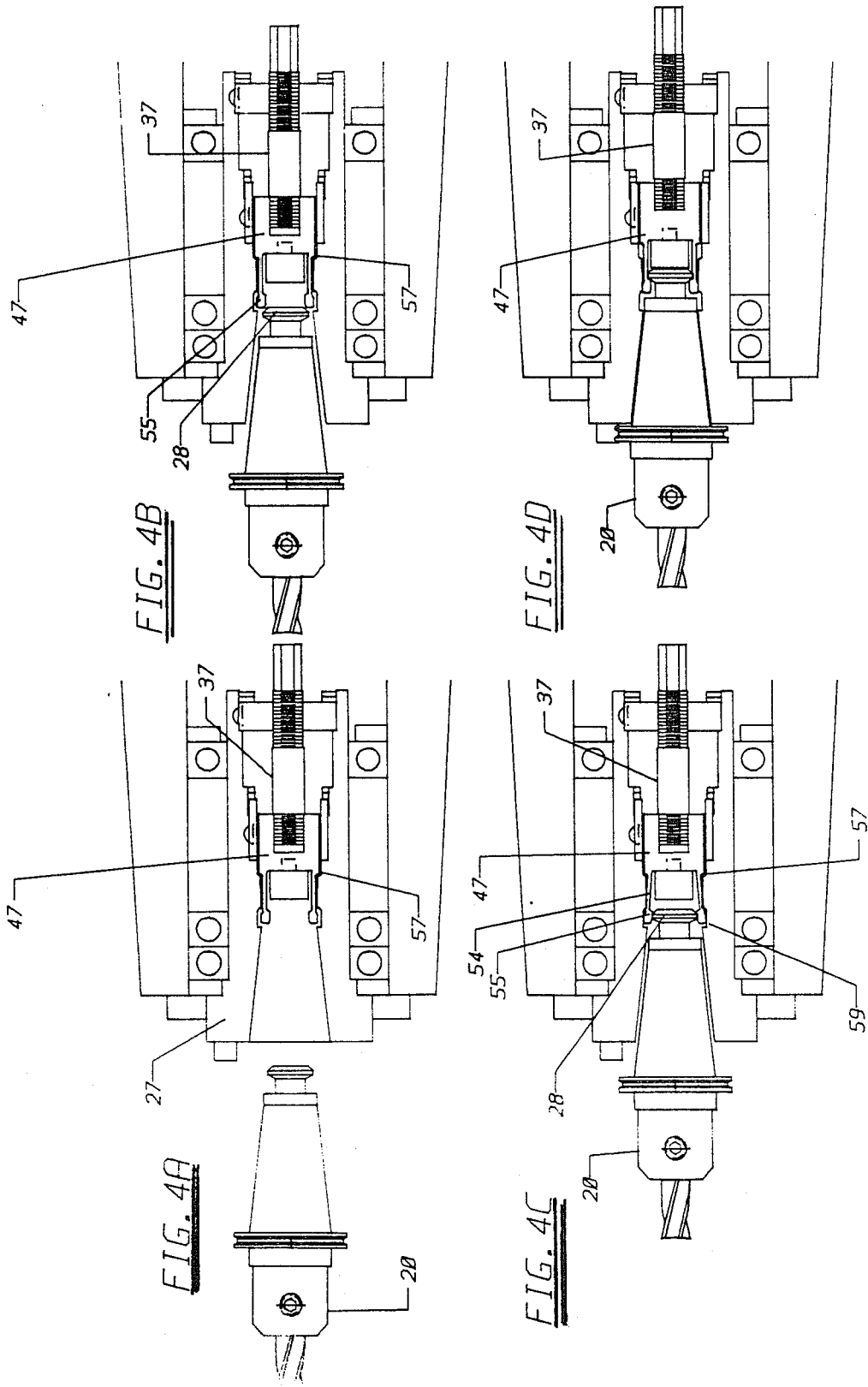

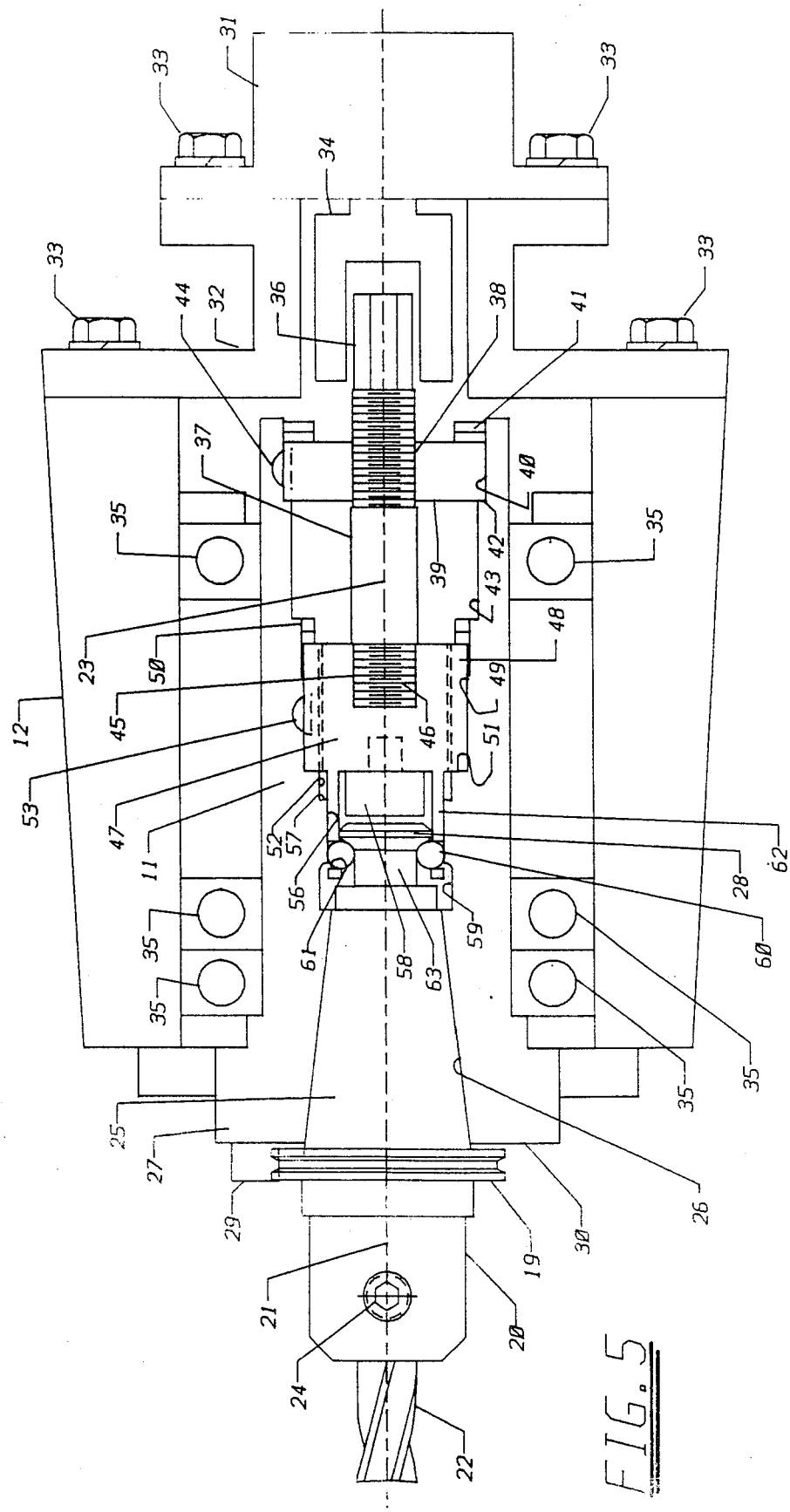

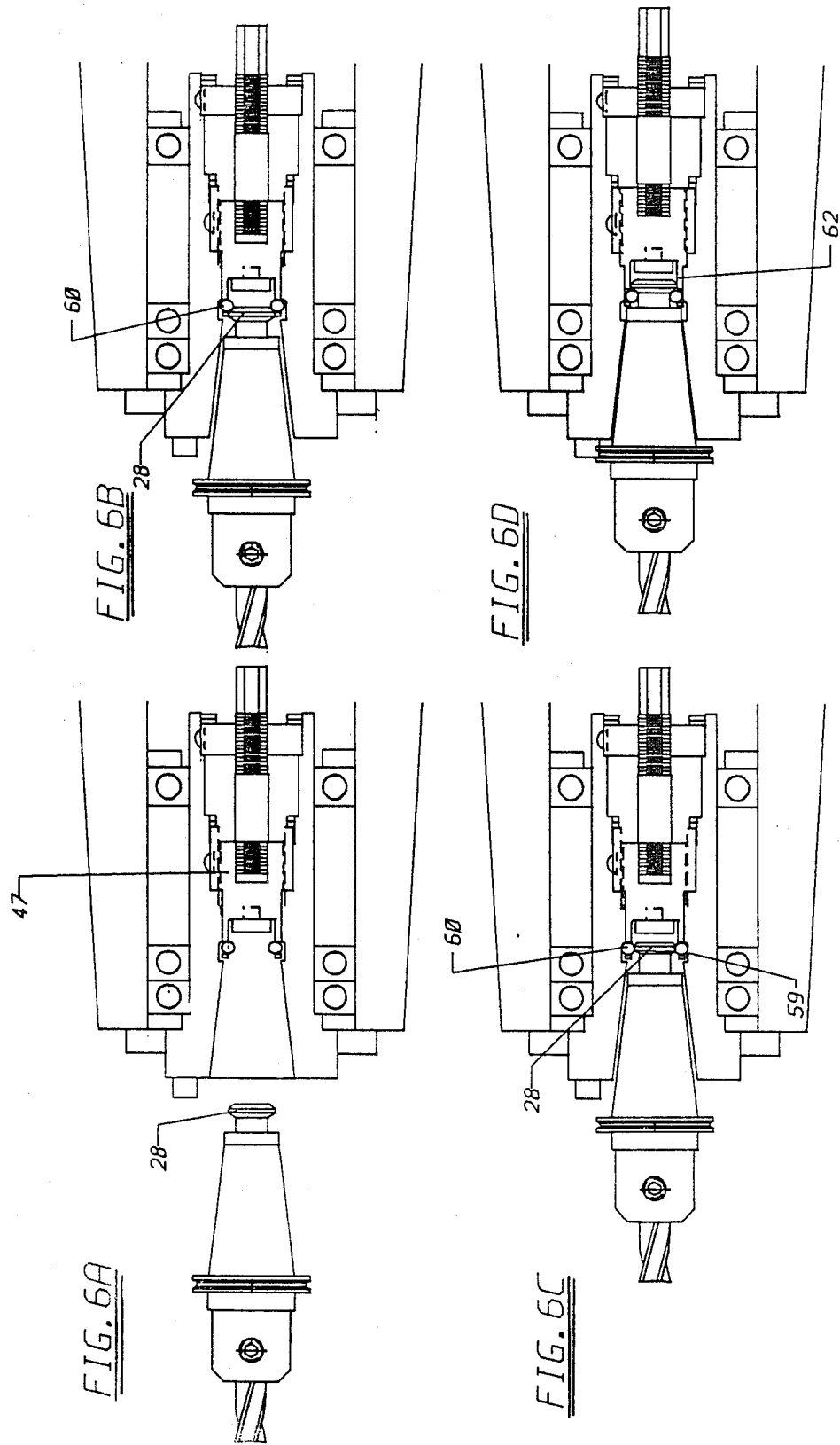

TOOL SHANK RETENTION MECHANISM WITH MACHINE TOOL THEREFOR

BACKGROUND OF THE INVENTION

1. Field of the Invention

This invention relates generally to the machine tool arts and particularly to the improvement of the tool retention capability of the spindles of those computer numeric controlled machines that are commonly called multi-axis machining centers, which automatically change tools that are mounted in tool shanks, and are capable of performing a wide variety of rough and finishing metal cutting operations, including milling and contouring, where the predominant type of tool in use today is the spiral fluted cutter.

2. Background Information

The following account will contain this inventor's views of machine tool history as it pertains to his patent application. Certain observations on practices and decisions of the machine tool industry are made, and his analyses of the problem of tool retention in machining centers, including his conclusions and efforts that led him to the present invention, are presented.

MILLING MACHINE SPINDLES

Prior to the advent of multi-axis machining centers with automatic tool changers, the hollow spindle was a design format that had been historically used in metal cutting machines where the tools were manually changed, such as milling machines and boring machines.

In 1927 a dimensional standard for milling machine spindles was adopted by the milling machine manufacturers of the National Machine Tool Builders' Association. The tool shank taper must mate with the standardized spindle taper, which was chosen by the Association to match the standard steep machine taper of 3.5" per foot. A taper is employed to provide a more effective alignment base for the tool than is possible with a straight bore. It should be pointed out that these milling machine tapers are of the self-releasing type.

Dimensions for all essential features of spindle noses and mating tool shanks may be found in *Machinery's Handbook*, 21st edition, 3rd printing (1980), as follows:

Table 1. Essential Dimensions of American National Standard Spindle Noses for Milling Machines (ANSI B5.18-1972), on pages 1740 and 1741, and Table 2. Essential Dimensions of American National Standard Tool Shanks for Milling Machines (ANSI B5.18-1972), on page 1742.

In all machines the spindle nose is supported by a hollow spindle, which is motor driven to transmit torque to the tool shank by an arrangement of driving keys on the spindle nose face which engage mating driving slots in the tool shank flange, as shown in the drawings that are included in the above tables.

Tool shank installation and removal from the spindles of conventional machines was historically done by a "set-up" operator, who selected a cutting tool and secured it into an American National Standard (ANSI) tool shank. Next, an ANSI "draw-in bolt" was installed into the small tapered end of the tool shank.

End dimensions of draw-in bolts are also given in *Machinery's Handbook*, 21st edition, 3rd printing (1980), as follows:

Table 3. American National Standard Draw-in Bolt Ends (ANSI B5.18-1972), on page 1743.

The length of the draw-in bolt was not standardized and it was left to the set-up operator to select the appropriate bolt.

The free end of the ANSI draw-in bolt, with the ANSI tool shank and the cutting tool attached, was then inserted into the ANSI spindle nose so that the threaded end of the draw-in bolt protruded through the hollow spindle bore a sufficient distance to permit installation of a "nut plate" on the rear of the spindle. This was followed by a "threaded nut", which was turned by the set-up operator in a direction to draw the draw-in bolt rearward, away from the spindle nose, thus mating the tool shank taper into intimate relationship with the spindle nose taper. On large machines, it was sometimes desirable to have two set-up operators, one at the spindle nose to guide the tool shank taper into proper seating, while the other tightened the rear nut.

Most frequently, the increment of wrench torque applied to the rear nut was enhanced by the set-up operator, who used a five to ten pound hammer to apply force impulses at the end of the wrench lever to jam tighten the nut. Obviously, such unstandardized technique imparted a random quality to the magnitude of the tension pre-load of the draw-in bolt, which must retain the tool shank in the spindle nose against the variable cutting forces experienced by the tool. As a general practice, when changing tools, the set-up operator would forcibly drive the draw-in bolt assembly forward to unseat the tool shank from the spindle nose, after first removing the nut and nut plate.

However crude and variable the hammer tightening may have been, there never was any need for refinement of the above set-up technique, since the pre-load thus established generally proved to be in excess of that required to overcome any axial forces that were generated by any cutting tool actions.

Because of the universal success of this rough system in an era of manually controlled machinery, no one worried about the actual magnitude of the axial forces that were being generated by spiral fluted cutters. Thus knowledge of the true force requirements for retention of these tools was not considered by the manufacturers to be of significant importance when the major shifts in the machine tool industry, first to automation, and then to numerical control by computer, occurred.

TOOL RETENTION FOR AUTOMATIC TOOL CHANGERS

Automation brought the objectives of speed and minimization of operator set-up requirements. The automatic tool changers that were developed were not based on the historic milling machine tool retention arrangement, although tool removal was clearly facilitated by continued use of the self-releasing taper.

Thus the hollow spindle nose, with its tapered bore entrance section, and the mating self-releasing tapered tool shank, as found in modern computer numeric controlled (C.N.C.) machining centers, are carry-overs from the milling machine past.

*Machinery's Handbook*, 21st edition, 3rd printing (1980) states the vital technical consequences of this selection of the self-releasing taper type on page 1727 as follows, "The included angle in this case is over 16 degrees and *the tool or arbor requires a positive locking device to prevent slipping,* but the shank may be released or removed more readily than one having a smaller taper of the self-holding type." (Emphasis added.)

This need for a positive locking device is not new, although the time seems ripe for it to be recognized again. The first printing (1949) of the first edition of the Tool Engineers Handbook issued by the American Society of Tool Engineers, which predates the coming of multi-axis machining centers, said on page 1854 that "Steep or self-releasing types of tapers are distinguished from the self-holding type by the taper angle which is sufficiently large to *make retention of the shank dependent upon a positive locking device,* the taper fit between shank and socket serving only to maintain alignment. *These tapers will release themselves."* (Emphasis added.)

In other words, if these tapers are not at all times locked positively, they will simply fall out of the machine.

While the ANSI standards for spindle noses and self-releasing tool shanks were carried forward into tool changer systems, use of the draw-in bolt was dropped completely. However, the diameter and threading of the draw-in bolt, as it formerly screwed into the small tapered end of the tool shank, were retained as the standards for anchoring an identically threaded connecting stem of a new retention knob. This is shown as the diameter M in Table 3 on page 1743 of *Machinery's Handbook,* 21st edition. The retention knob itself is an enlarged section having a major diameter that depends upon the shank size, but is at least $1.4 \times M$.

Automatic tool changers function in coordination with a knob retention arrangement which retains the knob and its attached tool shank and cutting tool in proper orientation with respect to the spindle, but will release them on command.

The goal of the whole machine tool industry became maximization of the speeds of releasing the knob and removing the tool shank and previously used tool from the spindle nose, and inserting the new tool assembly and grabbing the ne knob. Changing is accomplished by a movable tool changer arm that functions with a tool assembly inventory in a storage arrangement that is accessed by the arm.

The jam tightened draw-in bolt went to the museum, and at that time, apparently no one realized that, with it went an important overlooked factor, namely positive locking.

MACHINING CENTERS

Computer numeric controlled (C.N.C.) machining centers are designed to perform metal cutting operations on a workpiece that is restrained in a known location on a planar horizontal work table. The work table is positionable by planned simultaneous coordinated movement along its x and y axes. A main power spindle is mounted with its axis of rotation either perpendicular or parallel to the work table plane. The spindle is controllable in position along the vertical or z axis. In addition, controllable rotary or tilting tables may be placed upon the basic work table to provide two or more axes of additional movement.

Furthermore, the main power spindle may itself be positionable in angular displacement in two additional axes.

Movement of the workpiece with respect to the rotary tool mounted in the spindle may be selectively controlled by programming the computer control of the machine. This consists of preparing an organized geometric description of the desired shape into which the workpiece is to be cut, together with the determination of a series of key points on this shape at which two or more of the available axes of movement can be directed to converge.

The resulting program is stored in computer memory and is used by the computer to generate electrical signals which control the servo motors operating the movement of each machine axis.

Each axis has a measuring device which tracks the actual axis position relative to a previously known reference. This data is compared by the computer with the desired termination point of each particular axis movement then underway. A proportional closed loop servo system is dedicated to each axis to assure termination of the axis movement at the appropriate key point on the workpiece shape. Each servo subsystem must deliver the desired movement of its axis in concert with the assigned movements of all the other axe under widely varying cutter loads and axes movements.

It is apparent that the horsepower delivered by the main spindle drive motor is something of a measure of the amount of metal being cut per unit time, assuming that an appropriate cutter has been selected for the computer programming design.

The basic frame of the machining center must resist all of the loads imposed by the spindle positioning and angular displacement servo movements, and from the work table translation, rotation and titling servo movements, as well as assure that the workpiece and work table do not move inappropriately under the cutting forces. Coolant flow subsystems counter thermal distortions of the cutting tools and workpiece. Lubrication subsystems counter wear and thermal distortions of the moving components.

PROBLEMS WITH TOOL RETENTION SPRINGS

Shop operators purchased machining centers on the basis of the nameplate spindle horsepower ratings, but found that this figure could be achieved only when using straight cutters. Buyers did not realize until after delivery that their big machining centers would become weaklings with spiral cutters. The reasons were not clear.

In retrospect, it seems likely that it was the operational requirement for a two direction action to handle the knob in an automatic tool changer system that led to the draw-in bolt's abandonment. Designers of automated tool changers were apparently unaware that they were settling for less than positive locking in their rush to achieve the speed offered by a push-pull bar.

As will be seen when various patents are examined, the new tool retention arrangement that was universally adopted for machining centers replaced the draw-in bolt with a bi-directional draw bar that was pulled into place by tool retention springs. Tool retention by the spring method received wide acceptance and became the standard of the industry for tool changer systems in machining centers.

The draw bar configurations found in most automatic tool changers are bifurcated designs requiring two separate systems or power sources, the first for draw-in action by pulling on the draw bar, which is done by the spring, and the other for releasing and expelling the tool shank from the spindle nose by pushing on the draw bar, which is done by some motorized means.

But when customer troubles ensued and were reported to the manufacturers, it was apparently never recognized anywhere in the whole machine tool manufacturing industry that the real culprit was the ineffective spring retention system.

This inventor has discovered that retention springs not only have extremely limited force capabilities, but they possess other dynamic defects which make them unsuitable as a positive locking device at any dynamic axial force level. In fact, the first thing to be pointed out is that a spring is not a locking device at all. A true lock does not yield until the metal of the lock breaks, while a spring always yields at, or even below, some *static* force rating. This occurs because a static force rating is only applicable to a static situation and is not applicable to a *dynamic* or changing force situation.

This inventor has also found that, since the retention spring must be located in the rotating spindle, unless the spindle is made vastly oversized, it cannot be configured to contain a spring with a *static* force rating equal to the time *average* dynamic axial force requirement that is created by the use of spiral cutters operated at the spindle horsepower rating. Such an oversize spindle would have to be so big that it would require much larger bearings, thus tending to limit operations to very low speeds. This would never be done in practice. Thus all current machining centers with automatic tool changers suffer a common ailment: their draw bars are universally biased by springs of *inadequate static force capabilities*.

BELLEVILLE WASHER SPRINGS

It should be made clear that it is fundamentally impossible for a spring retention system to supply either the static or the dynamic tool shank retention force of the historic manual system, even when the best available springs, called belleville washers, are used. Loaded statically or dynamically, the historic system held until it broke at its weakest point, which occurred with a factor of safety well above the machine's rated capacity.

Belleville washers were early used in the famous French 75's of World War I as a recoil absorber. It is a spring made of a stack of concave washers, edge to mating edge on the perimeter. With its *static* snap action type of characteristics, it tends to hold stiffly to its rated force figure for early displacement, but then will release. Their *dynamic* characteristics are not much better than coil springs for use as tool retainers, although they have a higher frequency response than a coil. For example, a belleville washer may stiffly hold its rated force of 4,000 pounds over a displacement of 20 thousandths of an inch, but it will *always* allow some unwanted displacement to occur dynamically simply because it is not a locking mechanism.

Another serious problem with belleville springs is the wearing of the washer edges where they touch each other. While this can be overcome by regular maintenance, it really amounts to routinely rebuilding the springs, which is difficult and well beyond the capability of most machine shop operators.

SPRING DYNAMICS

The fact is that any spring starts reacting to a dynamic chang in load the instant the change is applied. The belleville washer is no exception.

In addition, this inventor has found that the static tool retention spring forces of different manufacturers vary widely for machining centers of the same rated horsepower. There is no industry standardization of tool retention spring force for machining centers of a given rated horsepower. The maximum axial stati retention force that this inventor has found in machining centers of 20 horsepower spindle rating is 7,531 pounds. A certain world-wide manufacturer currently supplies 4,400 pounds, while a force as low as 2,800 pounds is seen in another make of 20 horsepower machining centers.

Furthermore, the tool releasing mechanism, which is usually a hydraulic actuator or a cam system, must expel the tool by overcoming the retention spring force. If these springs were made more adequate statically, not only would the spindle have to be oversized to contain the spring, but the expelling system would have t be enlarged correspondingly to overcome the bigger spring to release the tool shank when changing tools. Thus the machining center designer has a catch-22 situation resulting from the poor original design choice of the spring method. Several component parts must be unduly enlarged, way beyond the true needs of the machine's nominal horsepower rating, simply to make it have a larger static force tool retention capability, which still can *never* be equal to that of the historic system, being only that of a bigger spring.

Then there is a further catch which relates to the inadequate dynamic performance of *every* spring. Enlargement of the spring will not enable it to run with spiral fluted cutters at rated nameplate horsepower because no spring will ever be able to provide the needed *dynamic force tool retention capability* equal to that of the historic system.

The cause of the defect in the dynamic response of any real spring, which makes it deviate from its ideal static force characteristics under dynamic or changing conditions, is that the real spring does not consist only of the idealized property of pure "spring", but must be made of material that also has the idealized property of pure "mass", and the two "pure" properties interact in a very complex manner.

For this reason, designers try to get away with using the smallest possible spring so as to minimize the undesirable effects of too much mass. But it is impossible to make a massless spring, so the ideal is never realized.

The response of any mass is governed by Newton's law, which as applied to a real spring, states that a force suddenly applied to one end of the spring, is actually applied instantaneously only to the mass at that end, and not instantaneously to the mass of the whole spring. Thus the resulting immediate acceleration is only that of the end mass and not that of the whole spring's total mass end to end.

A naive view of a tool retention spring, based on incorrect thinking from the purely static situation, would say that the end mass cannot move at all in response to changing tool forces below the bias level, since the spring is kept in place perfectly by the full bias force of the pre-load tension (or compression, as the case may be) that was statically stored in the spring. But that is not the case. A spring is really a mechanical transmission line, analogous to an electrical transmission line.

Just as an electrical signal propagates down a transmission line at its characteristic velocity, irrespective of whether the line has been initially charged over its entire length (which is analogous to the spring's preload tension), a mechanical force disturbance propagates down the length of the spring at a certain velocity which is characteristic of the spring. Depending upon boundary conditions at the far end, there may be force reflections sent back. This is known as the response of distributed parameters. If the spring is highly damped, as in the case of the belleville washers, there may be no reflections. However, the far end of the spring still knows nothing of the changing force pattern until it is transmitted over the spring length and eventually received at that end.

In the case of the spring, we can imagine it cut into many little sections. Each section has its own little piece of idealized mass connected to the next section's little piece of idealized mass by a little piece of idealized spring.

In addition, the mass of the various tool connected items that apply the force to the end of the spring must be taken into account. We must combine the masses of the tool, the tool shank with its knob, the knob grabbing arrangement, and the connecting structure at the end of the spring. When this combined mass is displaced in an integrated Newton's law response to the changing axial tool force, it pulls on the next little piece of distributed idealized mass only through the connecting little piece of distributed idealized spring. In turn, this little piece of mass pulls on the next little piece of mass through its little connecting piece of distributed spring. But each little piece of connecting spring can only provide a differential retention force which is generated in that little piece of connecting spring by the small bit of relative displacement that has occurred. Thus a small unseating motion can occur dynamically at one end of a spring, which the static force capability of the spring is powerless to prevent.

When the additional possibilities of complex spring-mass resonances that can be stimulated by cutter flute torque pulsations, and mechanical reflections occurring at structural boundaries, are added to the situation, it should be no surprise that a spring does not constitute a positive lock. The complicated dynamical force behavior of an actual spiral fluted cutter on its workpiece is not readily amenable to mathematical analysis. Spring designers generally proceed in a cut-and-try fashion, hoping to end up with the smallest and stiffest minimum mass spring possible.

In any event, this inventor has determined to his satisfaction that a spring is seriously ineffective for tool retention purposes.

PROBLEMS OF SHOP OPERATORS

These basic deficiencies of conventional machining center tool retention led to serious job estimation and operational problems for machine shop operators. The most serious job estimation deficiency stems from the fact that the nameplate spindle horsepower rating on a machining center cannot be relied upon to calculate the true metal cutting output with a spiral fluted cutter. Today this is the predominate cutter used on most machining center jobs.

Shop operators have found to their sorrow that the machining centers with automatic tool changers of all manufacturers currently on the market today, as well as their earlier models, must be operated at considerably less than their rated nameplate horsepower when spiral fluted cutters are used.

Close bidding on every job requires real knowledge concerning the achievable horsepower of individual makes of machines, with particular spiral cutters, and with different kinds of cuts, because of the wide variability of retention spring performance. This data can only be obtained by shop experience over a period of time. The nameplate horsepower is meaningless, since the spindle drive motor must loaf along while the machine capacity is wasted with a spiral cutter, for otherwise damage will result.

Depending upon the magnitude of the spiral cutting tool axial counter forces, a whole spectrum of deleterious operational results can occur if the operator tries to raise output. Increased machine down time, additional required maintenance, damage to work and machines, and lowered operator safety are inevitable consequences.

The following paragraphs describe this inventor's personal observations of what happens.

1. Even at a low level of vibratory tool axial counter force with respect to the spring's static rating, a damaging spring-mass oscillation can commence.

2. As the dynamic axial spiral cutter forces rise but remain well below the actual magnitude of inadequate static spring bias provided by the manufacturer, a large spring-mass cutting tool vibration frequently takes place. The workpiece surface can be damaged, particularly if a finishing cut is in progress, as the cutting tool describes unwanted taper release oscillations. A retention spring can never be a positive lock in the dynamic sense.

3. When the dynamic counter forces approach the static spring force, the dynamic spring-mass vibration can generate extremely damaging chatter at the tool due to a large magnitude of alternating tool release and retention.

4. With intermittent overcoming of the spring bias, considerable periodic tool release ensues. The workpiece surface is generally gouged.

5. Moderate overcoming causes the tool shank to fall loose in the spindle nose with severe damage to the tool, tool shank, spindle, and workpiece. Pieces of metal can fly about.

6. A sudden overcoming of the spring at the wrong time and place with respect to the shape of the workpiece can totally release the tool shank and attached tool to become a free whirling projectile in the shop room. Personal injury and serious property damage can result.

DISPARITY OF WORKPIECE RETENTION AND TOOL RETENTION FORCES IN CONVENTIONAL MACHINING CENTERS

Recognizing that the reaction forces generated by machining operations must be equal and opposite on the tool and workpiece, it would be logical to assume that the manufacturers of machining centers therefore provide roughly equal magnitudes of workpiece and tool retention capabilities. This inventor was surprised to discover during his investigation that such is not the case. So far as he can determine, the workpiece is held considerably more securely by the products of all manufacturers than are the tools.

For example, in a 20 horsepower machining center produced by a world class manufacturer, the work table clamping force is 16,000 pounds. The manufacturer specifically cites this high value as "allowing accurate and heavy duty machining." However, his second statement in the same publication that "Our high pressure (tool) clamping force of 2,000 kg (4,400 lbs) and our tool weight capacity of 20 kg (44 pounds) assure you of non-slippage and extended tool life" is a gross exaggeration, which has not been realized in the personal experience of this inventor.

Another 20 horsepower machining center by the same manufacturer provides only 3,960 pounds of tool clamping force with a disproportionate 20,460 pounds of table clamping force. The rated torque of this so-called "20 horsepower" machine is stated to be 429 ft.lbs. at 223 R.P.M., which is equivalent to 18.21 H.P., or only 91 percent of the nameplate figure.

If this lowered rating were to be developed on a spiral fluted cutter, the axial tool unseating force generated can be calculated by applying the geometry of the spiral or helix.

In general, for a $\phi$ degree spiral fluted cutter, where $\phi$ is the helix angle, the first point of contact with the workpiece is the end cutting edge and some increment of the radially raked helix angle.

If the flutes were parallel to the cutter axis, then $\phi=0$, and the only axial thrust from this straight cutter would be the result of the frictional component, which is of no import to our calculation. Similarly, tangential forces and other dynamic displacements are not considered. Thus the tool unseating axial force $F_u$ becomes $$F_u = \{F_{cutting}\}[\cos(90° - \phi)]$$
$$= \{[Power_{cutting}]/[Distance_{cut}]\}[\sin\phi]$$
$$= \{[Work_{cut}/\text{minute}]/[2\pi(r_{cut})][R.P.M.]\}[\sin\phi]$$

For a one inch diameter (1/24 foot radius) 30 degree spiral fluted cutter absorbing 18.21 H.P. at 223 R.P.M., $$F_u = \frac{(33{,}000 \text{ ft.lbs./minute-H.P.})(18.21 \text{ H.P.})[\sin 30°]}{2\pi(1/24 \text{ ft.})[223 \text{ R.P.M.}]}$$

or $$F_u = 5{,}145 \text{ pounds,}$$

which is 30% more than the static tool clamping force and will totally unseat the tool.

If the full 20 horsepower were to be developed at this cutter, which rating is allowed continuously for only 30 minutes under the manufacturer's specifications, the axial tool unseating force becomes 5,652 pounds, or 43% more than the static tool clamping force. Stated alternatively, the tool clamping force of 3,960 pounds is only 70% of the minimum static force requirement, allowing for absolutely no factor of safety, and neglecting the problems of spring dynamic response, which must be answered in a truly practical solution.

This inventor has concluded that it is vital that both the static and the dynamic tool retention capability of a machining center be comparable to the higher workpiece retention capability, and no claim concerning heavy duty machining can otherwise be legitimately made.

DISCUSSION OF PRIOR ART PATENTS

A number of patents which will be discussed now were discovered during a search and were unknown to this inventor when he made his invention.

In reviewing these patents, there are two essential modern machining center design requirements which should be kept in mind: first, that the workpiece be positively locked and retained with respect to an established reference on a firm worktable or pallet, and second, that the cutting, burnishing, or measuring tool be held in a standard tool shank, automatically changed, and positively locked in use to rotate in an orbit that is fixed in space with respect to the work surface, and from which it will not deviate axially or transversely for any reason. In particular, the relationship between the surface to be cut and the tool doing the cutting must be rigidly maintained in spite of any tool forces generated by metal cutting, which can be very high.

The first requirement, that of anchoring the work, is the theme of patents such as U.S. Pat. No. 3,986,617 issued Oct. 19, 1976 to Blomquist and is not the subject of this invention.

The second requirement, that of maintaining the tool orbit, will be seen to be enhanced by the present invention, when it is contrasted with these patents. Spring patents, which will first be described, particularly fail in this respect.

In addition, the same disparity between workpiece and tool retention capabilities, that has been ascribed to the current products of various manufacturers, is also believed to exist in the spring system patents.

SPRING SYSTEMS

U.S. Pat. No. 4,102,035; Voglrieder et al.; Jul. 25, 1978

U.S. Pat. No. 4,173,817; Voglrieder et al.; Nov. 13, 1979

The tool retention arrangement identically described in both Voglrieder patents is typical of the standard-of-the-industry spring actuated tool retention systems currently supplied on modern machining centers.

The main defect of such systems is their universal use of a retention spring of grossly inadequate capacity. This is due to an inherent spindle size limitation that binds all inventors and manufacturers equally.

There is simply no way to mount a larger spring in Voglrieder without going to an unreasonably large spindle that is disproportionate to the rest of his machine. This can be readily seen by studying the mechanism and examining the available space in Voglrieder's drawings.

Referring to FIG. 14A of these patents, within the spindle body 87, a draw bar retention spring 126 under compression is mounted in the spindle bore 125 with its forward end resting against a shoulder 127 of a concentric smaller bore 113. The rear end of the spring rests against a flange 130, which is made integral with the rear portion of the axial draw bar 115. The tapered shank 105 of the tool holder 104 is retained in the spindle's tapered socket 106 entirely by the rearward axial force of this spring on the draw bar, which transmits the force through the attached collet body 116, the collet fingers 117, and collet heads 118 to the tool holder retention knob 120.

To release the tool holder 104 from the tapered socket 106, a pivoted wedge 248 displaces the rear of the draw bar 115 forward, further compressing the retention spring 126. With this forward motion, the draw bar head 123 engages the retainer knob 120 to unlock the seated tool holder from the tapered socket of the spindle.

The allowable size of Voglrieder's spring is severely bounded by the small amount of toroidal space available in the spindle body's bore 125. In turn, the tool retention capability is greatly restricted by the corresponding limitation on spring force. The inadequate axial spring force provided by Voglrieder would be readily exceeded during machining operations employing spiral fluted cutters at a low main spindle power level, and accompanied by tool unseating.

The computer control of the machining center would be ineffective to cope with the problem.

In Voglrieder, large non-linear vibratory forces and displacements at the cutting tool can be expected to accompany wild pulsations of the tool retention spring as the limited spring force is irregularly overcome by the axial spiral cutting tool forces. This can damage the machining center, as well as destroy the tool, the tool shank, and the workpiece.

The safety of the machine operator and others standing nearby would be endangered by the possibility of being struck by a tool holder projectile or by flying pieces of metal that can break off the tool and the workpiece. The automated production system of which the affected machining cen.ter is a part would be thrown off schedule by the down time while unscheduled repairs must be made.

All of the above deleterious effects have been observed by this inventor on machines very similar to Voglrieder's design.

Thus, in the opinion of this inventor, Voglrieder is a classic example of the industry-wide situation where ineffective spring retention of tools prevails.

SPRING SYSTEMS WITH BACKUP LOCKING

U.S. Pat. No. 3,875,848 Powell Apr. 8, 1975

This patent shows some brief recognition of the tool holder ejection problem in the third paragraph of column 1. However, it does not present a practical solution.

Powell retains the tool retention spring arrangement which, by this inventor's analysis, is the root of the problem. Then it adds more complicating devices to try to inactivate the bad effects of the springs instead of eliminating them. In any case, it is believed that the method proposed in Powell has not been adopted in practice by any manufacturer.

A set of two draw bar springs 30 and 32 are used. Then Powell provides a lockout mechanism that can be released to change tools, but which tries to lock the draw bar against movement when it is in its active tool holding position. The active locking elements are balls 64, which are restrained to prevent axial movement of the draw bar 24 to release the tool holder 20 from the socket 18. This restraint involves the converging angles formed by the constraining surface of wedging member 58, the wall angles of apertures 62, and the inclined surface of the side wall 68.

Trying to hold the large draw bar assembly by means of balls involves critical multiple "point" contacts, which when axial force is applied, are squeezed into very small "area" contacts. Powell therefore provides a significantly weakened locking force capability, even assuming that the ball mechanism is in perfect order. Crushing of the ball contact points would seem to be the weakest spot. The balls will brinell rapidly in service and the "lock" will become loose with a high ball failure rate. The spindle must be disassembled to replace defective balls. If they are not replaced, then Powell's tool retention performance degrades to that of the underlying conventional spring system, with all its inherent defects this inventor has enumerated. Since the spring system is in almost continuous trouble with spiral cutters, Powell's lock will be stressed almost continuously.

In addition, it is believed that the reliability of this structure is additionally decreased by the number of components required. The reliability of any system is compromised as the number of components that must interact with each other is increased. Thus a low mean time between failures seems likely here for reasons beyond the brinelling of the balls.

U.S. Pat. No. 4,131,054; Johnson et al.; Dec. 26, 1978
U.S. Pat. No. 4,148,246; Johnson et al.; Apr. 10, 1979

The tool retention arrangements described in both Johnson patents include efforts to sidestep their inadequacies resulting from weak spring retention of the tool holder by means of adding a second or backup tool locking system.

The difficulties with this auxiliary system lie, first, in its being structurally weaker than the primary spring system so that no real security is added; second, in the introduction of a special tool holder complication that does not fit well with accepted industry standards and would be a costly nuisance; third, in the second system's lack of independent capability and actual dependence upon the underlying spring system; and fourth, in the introduction of new opportunities for things to go wrong.

We will first consider the spring rtention arrangement of Johnson by itself, and then with the auxiliary system added.

The portions of FIG. 1 of both patents in which we are primarily interested are identical. In the right half of either FIG. 1 drawing, the forward spindle assembly 10 has a tool holder 12 with a tapered shank 56 held in place by collet fingers 68 acting on retention knob 67.

These two patents are also identical in their dependence on a spring retainer assembly 61 to retain the collet body 60 in proper axial alignment with respect to draw bar 62. The retainer assembly consists of a plurality of disc type springs 61' located on the shaft of a machine screw 61" that is fixed into the forward end of the draw bar. These small springs are preloaded to press forward against the head of the screw, and to press rearward on the collet body, to try to force that body's pilot bore onto the front end of the draw bar to achieve its closed position.

The principal defect of the design is that the collet body is still axially displaceable in the forward direction from the desired closed position, along the shank of the machine screw. Thus tool insertion and retention depend criticaly upon the force capability of the springs which oppose this displacement.

Positive seating of the tool holder may never be attained or, if attained, can be lost if the rearward spring force on the collet body is overcome by any machining operation that generate forward axial forces that exceed the rearward spring force.

The spring volume available within the normally sized spindle is too small to contain big springs with adequate tool retention capability. It is noted in the patents that a "suitable" type of disc spring is a belleville washer. Even springs of the belleville type are not large enough to enable the Johnson device to function properly, although they are probably the best ones available today.

We shall now consider the effects of adding the auxiliary locking system to the belleville spring system.

Although it is stated in the patents' specifications that the tool holder may be of any conventional type, no conventional type is illustrated in the drawings; instead, the design inadequacy of the belleville springs is addressed by adding a specially designed, considerably more expensive, non-standard "self-locking chuck" or tool holder 12.

Whenever spiral fluted cutters are used with this Johnson design, the accompanying generation of axial forces will necessarily require perfect functioning of the special chuck's lock to make up for the belleville springs' force limitations. Thus the deficiencies of the special chuck will become critical in normal operations, since the generation of axial forces is an everyday occurrence in modern machining.

Study shows that the security of this chuck basically rests on the hope that nothing will happen to overcome the weak retainer assembly springs during chuck seating. The force of seating that is delivered to the chuck is supplied *only* by the compression of the small springs 61', and not by the ultimate capability of the drive motor 20 and its associated mechanism.

At the start of machining operations after a tool change, no one will know whether the belleville springs have pulled the special chuck into the spindle enough to seat the taper, except to stop the machine and make a careful inspection. If the taper seems seated, no further visual inspection can determine whether the auxiliary lock has functioned since it cannot be seen. The switch means 17 only detects a broken collet or acts as a no-tool holder indicator.

If the retainer assembly springs do not pull the tool holder into place, the self-locking mechanism is prevented from locking due to misalignment of the balls 119.

The retainer assembly springs 61" must also provide the "self-locking" actuation to lock the chuck by pulling on the plunger 101. Otherwise, the "self-locking" function depends on another very weak spring 145. The use of the word "self-locking" can mislead a reader of these patents' specifications, since possible troubles that can defeat the feature are not discussed.

For instance, if dirt or chips get into the tool holder lock mechanism, it can fail, since the small force supplied by spring 145 may not expel little pieces that can become trapped. The force of locking supplied by the retainer assembly springs pulling on plunger 101 may also be inadequate to fully work the lock, and plunger 101 may be displaced slightly.

Inspection for blocked locks on tool holders about to be inserted into the spindle by the automatic tool changer is very desirable. Routine special cleaning of the locks before insertion would be a minimal requirement.

The mechanical strength of the chuck lock is not stated in the patents and the technique is unproven in industry since it is basically non-standard. But there appear to be evident design deficiencies.

Study of the expected motion of balls 119, activated by tapered plunger 101, as they act in recess 123, shows that the plunger appears to drive the balls toward the aft end of the spindle. This would seem to require a *forward* movement by the tool holder shank 56 to lock the balls in a restraining condition. This inherent directional conflict and the deleterious direction of slope of the spindle taper create a ineffective lock design believed to result in a loose tool holder.

Also, the belleville spring force on tapered plunger 101 appears to be a major ball constraint factor. If this is so, the two holding systems are not independent.

Thus the embedding of this secondary lock mechanism in the tapered shank of a non-standard tool holder introduces other technical troubles. Also it is not in the best interests of machine shop economics to require a special non-standard chuck for a particular machine tool. A good solution would use industry standard ANSI tool holders.

Most importantly, the auxiliary locking system of Johnson does not address the problem of the deficiencies of spring retainer systems generally, including Johnson's, by teaching a truly effective and secure single retention system.

KNOBLE SS SYSTEMS

U.S. Pat. No. 3,486,412; Schraub et al.; Dec. 30, 1969

Schraub's arrangement has a spring packet 32 and uses a special "intermediate member" 7 to replace the standardized knob. Non-standard means are employed to prevent tool rotation. It requires considerable operator action in tool changing and does not really appear to be suitable for automatic tool changer applications.

U.S. Pat. No. 3,893,371; Frazier; July 8, 1975

Tool clamping force is provided by the bias of belleville springs 80. Clamping members 117 and 118 act in a special non-standard manner to hold tool 106. A hydraulic piston moves the clamping members against the spring force to enable tool change.

Frazier appears to be at considerable variance with the needs of a tool changing machining center.

SPRINGLESS SYSTEMS

U.S. Pat. No. 3,520,228; Wohlfeil; July 14, 1970

This patent appears to present a strong but extremely complex non-standard tool retention arrangement that does not use springs, but which would not be accepted since it does not employ the standard retention knob, if for no other reason.

Wohlfeil uses a limited rotation (45 degrees) drawbolt 26 to grip a presented toolholder 25. This requires sensing of rotary drawbolt's gripped and released positions by transducer 28. The standard retention knob has been replaced by a special breech lock connection. There are lands 166 and grooves 167 on the end portion 165 of the toolholder, which rotatably engage complementary grooves 170 and lands 169 on the engaging end 168 of the drawbolt during the 45 degree rotation.

U.S. Pat. No. 3,842,712; Bondie et al. Oct. 22, 1974

This is an automated draw bar system. Axial loading of draw bar 141 is accomodated by thrust bearing 150 and threaded member 146, which is threaded and unthreaded by hydraulic orbit motor 159 into the body of tool holder 144 at each automatic tool change.

Bondie is superior to a spring retention system and more closely parallels the ancient art of manual draw-in bars. The time to operate is probably longer than a retention knob system. Tool retention capability could be compromised by thread wear of member 146 and possible error accumulation in the thrust bearing 150.

In today's industrial climate, the lack of the standard retention knob is probably a serious drawback.

U.S. Pat. No. 3,898,911; DeCaussin; Aug. 12, 1975

This patent relates primarily to a complex system for engaging and disengaging a driving connection, such as a spline, between a driving impact wrench 56 and a rotary draw bar 24. The draw bar contains a threaded portion at one end 28 for connection to a suitably knobless tool holder 22.

DeCaussin requires that the impact wrench engage the draw bar by mating spline 42 on the drive with spline 34 on the draw bar. This is accomplished by overcoming the force of a normally disengaging compression spring 62 by means of air pressure applied to piston 38. Engagement between the spline on the spindle and the spline on the draw bar is enhanced by momentarily causing the spindle to rotate as the spindle is moved from non-engaging position to an engaging position.

GENERAL OBJECTIVES OF THE INVENTOR

This inventor determined to devise a new tool retention system for machining centers, based on the following summary list of desirable general characteristics, which was compiled over a period of time as the work progressed:

1. The new method of tool retention shall have a positive tool holding capability fundamentally comparable to that of the historic manual system. This will eliminate workpiece scrappage, cutting tool edge dulling and destruction, machine down time, and other random costs caused by the common failures of the deficient tool retention arrangements in current use in machining centers.

2. The new tool retention mechanism shall not be overcome during machining operations by any axial forces generated by a spiral fluted cutter operated at the rated spindle horsepower.

3. The tool shank shall be released and expelled from the spindle only upon demand of the automatic tool changer's control system.

4. The method of tool capturing shall be fully compatible with modern automatic tool changers.

5. In order to completely avoid all of the current machine shop problems resulting from both the static force limitations and the dynamic response defects of conventional spring actuated tool retention systems, including unpredictable spring-mass resonances, the new system shall not use any springs for locking.

6. The new design shall be simple and not impose any new requirements on the design of machining centers generally.

7. The new mechanism shall employ the same single power source for both locking and unlocking.

8. The method of locking shall endeavor to systematize the historically successful random tightening by impact means.

9. The new mechanism shall constitute a positive lock which cannot be overcome short of metal fracture, either of the lock structure itself, or of other supporting structural parts in the spindle.

10. Non-standard modifications shall be avoided and in particular the new system shall function with the ANSI standard spindles, tool shanks, and knobs.

11. The times required to lock and unlock the tool shank shall be comparable to those of the current standard-of-the-industry spring systems so that the new system will be completely functional with existing automatic tool changer designs.

12. The new mechanism shall be compact and capable of being retrofitted into existing machining centers.

13. The preferred embodiment shall employ the strongest possible collet design. This is necessary since a collet was never used in the historic manual system, and the collet is a naturally weaker structure than the historic threading it replaced. However, the requirement of functioning with automatic tool changer existing ANSI standards is considered to be overriding at present. Thus a knob-grasping collet is an essential feature of the new mechanism.

14. The drive motor shall be bi-directional and capable of utilizing any of the existing machining center power supplies, namely pneumatic, hydraulic, or electric.

15. The drive motor shall be free wheeling in its de-energized state so that its output shaft can freely rotate without harm at all speeds utilized by the spindle during machining operations.

16. Axial slip means shall be provided to absorb any axial movement of the mechanism with respect to the drive motor that may occur between the locked and open positions of the collet. This shall allow the drive motor to be mounted aft of the spindle on the stationary frame of the machining center to simplify the power supply to the motor, which would otherwise require a slip pipe joint or slip rings if the motor were to be mounted on the rotating spindle.

17. The preferred embodiment design shall not depend on any thrust bearing or equivalent arrangement which does not compensate for wear automatically.

A solution to each of the above objectives shall be found in the preferred embodiment of the present invention. An alternative collet arrangement that has a weakness which is specifically pointed out will also be presented.

SUMMARY OF THE INVENTION

A novel, reliable, and fast acting tool retention subsystem is presented for easy integration into the automatic tool changer systems of machining centers. A machine tool incorporating the invention, or machining center, is described.

The invention is compact, has a speed of operation comparable to that presently achieved by spring retention arrangements, and is fully compatible with ANSI standards for spindles, tapered tool shanks and knobs. It does not require any non-standard modifications. Thus it can be readily retrofitted into existing machines, as well as improve the reliability of original equipment manufacturers' products.

This inventor's non-obvious contribution solves a number of long-standing problems that plague current standard-of-the-industry spring actuated tool retention arrangements. The practitioner of this invention will no longer have tool shank retention problems with the resulting tool chatter, taper unseating or shank release that occur whenever spiral fluted cutters are used at the full spindle horsepower rating. There is no spring bias to be overcome by axial tool forces, and the root cause of these difficulties is eliminated by the invention.

Although this inventor has totally abandoned conventional springs, he has created a system just as fast. Trustworthy tool shank retention is provided by positively jam locked rotary bolt actuator means. Since the bolt can be doubly and oppositely threaded, the wear problems associated with a thrust bearing can eliminated. Thus the possible use of jam locked single threading in conjunction with a thrust bearing is not recommended. A very high value of axial pre-load tension is systematically generated. This value is comparable to that which was historically furnished, albeit in a very random fashion, by the manual milling machine draw-in bolt retention system, when the set-up operator hammered on the arm of the tightening wrench that he applied to the rear nut.

In the invention a bi-directional, free-wheeling, impact motor drives the rotary bolt actuator between open and closed positions of a collet, as commanded by the automatic tool changer controls. The motor can be conveniently mounted on the stationary frame of the spindle housing, and is readily commanded by the computer control of the automatic tool changed as required by the tool changing program.

A maximally strong collet is described, resulting from careful attention to design, selection of materials, and fabrication techniques. The collet is driven axially by the rotary bolt actuator means, grasps the standard knob of the standard tool shank, and pulls the tapered shank body into a tight positive seating in the spindle nose taper. The pre-load tension of this positive seating is supplied by the mechanical strain of the materials of the jam locked mechanism and the supporting spindle structure. Thus the pre-load force is limited by the yield strength of the materials and not by the bias of any ordinary or belleville spring, as is currently done in the industry.

BRIEF DESCRIPTION OF THE DRAWINGS

FIG. 1 portrays some of the main features of an improved machine tool 10 that is a machining center. A compact partial section view of its main power spindle 11 with the core of the present invention installed therein is given in FIG. 1A.

FIGS. 4A-4D show the stages of the tool shank insertion for the preferred embodiment.

FIG. 5 presents an alternative collet arrangement in the present invention.

FIGS. 6A-6D show the stages of the tool shank insertion for the alternative collet arrangement of FIG. 5.

DISCUSSION OF THE DRAWINGS

Figure 2:
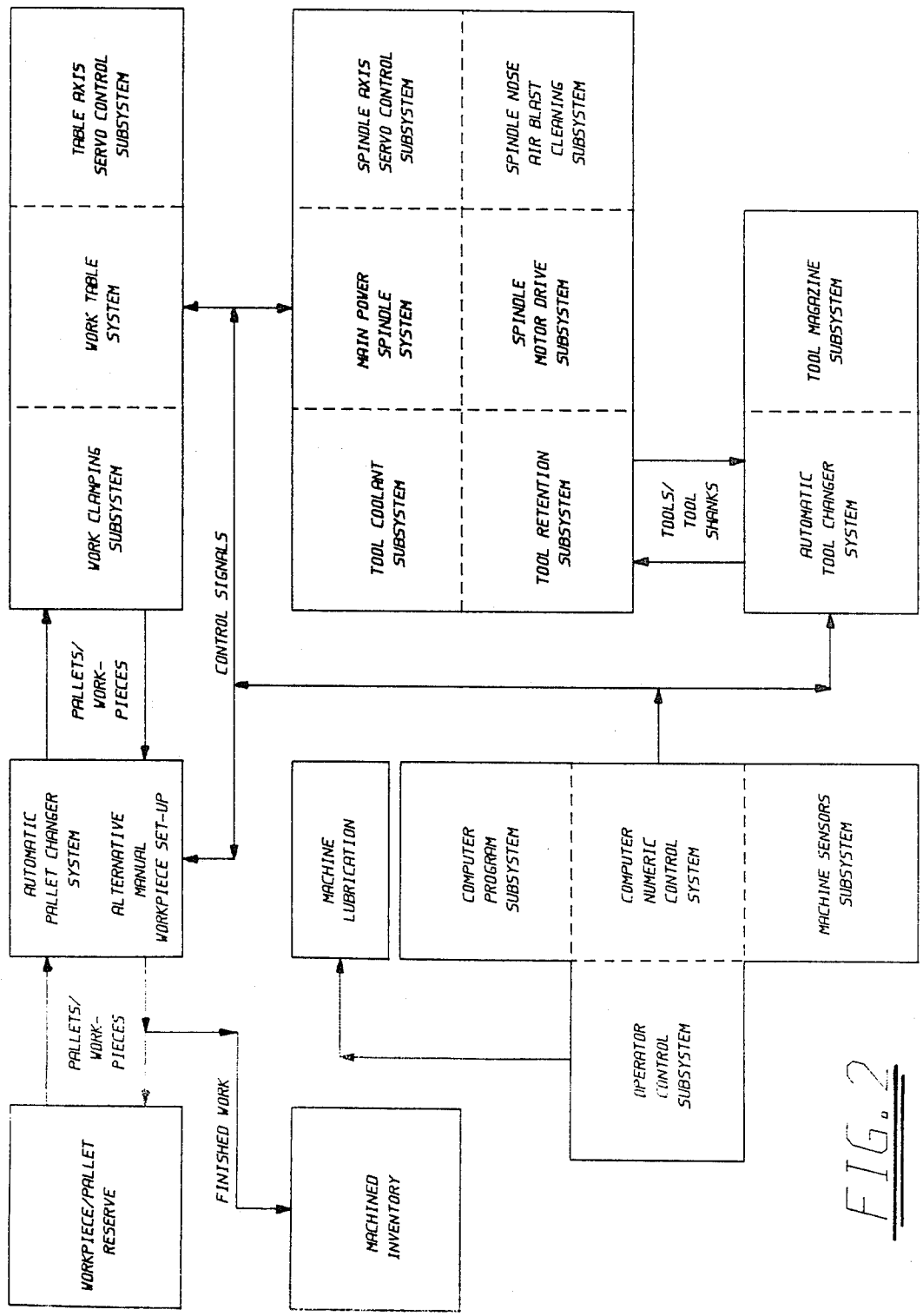
FIG. 2 is a functional block diagram of the systems and subsystems of the machining center. The core of the present invention resides in the tool retention subsystem block.

FIG. 1 depicts an improved multi-axis, computer numeric controlled (C.N.C.), automatic tool changing, machining center 10 having a main power spindle 11 rotatably mounted in a stationary spindle housing 12, which is shown oriented in a horizontal relationship to dual work tables 13. Various cutting, burnishing, and measuring tools that are mounted in tool shanks can be delivered to the spindle by the automatic tool changer system. These tools are then held in the spindle by a novel tool retention subsystem, which is the core of the present invention.

This invention is particularly adapted to disengage any tool from the spindle for removal by the automatic tool changer, and to engage and positively lock the next tool presented to it by the changer, on command, as will be described in detail.

Not shown in FIG. 1 are the gear box and spindle drive motor that rotate the spindle. These are located out of sight behind the spindle housing.

A workpiece to be machined, also not shown, would be firmly mounted on a work table, or delivered on a clampable pallet to a pallet changing work table by a pallet changer, not illustrated.

Continuously flowing coolant washes the cuttings made during machining operations to a chip conveyor 14 for transport to a chip bucket 15.

A tool changer selecor arm, not shown, extracts tools that are individually mounted in tool shanks, from an indexable tool storage magazine. Both the selector arm and the magazine are located out of sight behind the tool magazine access door 16, shown closed. The selector arm rotates the tool shank and tool axis ninety degrees in a horizontal plane while passing them through the opened doorway, in order to position the shank for transfer to one end of the tool changer arm 17. The changer arm is rotatable about its center, first, to insert the flange of the tool shank in one of its flange notches 18, located at either end of the arm, and second, to move the shank in a circular orbit in a vertical plane, which terminates immediately outside the spindle entrance with the tool axis aligned with the spindle axis.

Referring to FIG. 1A, which is a partial cross section of the spindle assembly, it will be understood that flange 19 of tool shank 20 has been so utilized by the changer arm in order to achieve the depicted alignment of the tool axis 21 of the typical tool shown, the 30 degree spiral fluted cutter 22, with the main power spindle axis 23. The tool is secured in its shank by means of the tool retaining screw 24, which is threadably inserted into the shank to mate with a diametrical notch in the tool.

After the axes are aligned, the arm is axially movable to urge the tool shank tapered section 25 into the mating tapered bore 26 of the spindle nose 27, which has been forcibly cleaned of all machining debris by a powerful air blast. In the meantime, the other end of the changer arm has been coordinated by the computer control to reverse these operations and remove the previously used tool for return to the selector arm and storage in the magazine. It will be recognized that the functions of the separate selector arm and changer arm might be combined in a single arm, depending upon the arrangement of the spindle and the details of the tool magazine.

When the changer arm has presented the tool shank into the spindle nose entrance, the tool shank retention mechanism of the present invention functions to assure complete seating of the tapered shank throughout all subsequent machine operations for which that shank may be intended, including cutting, burnishing or measuring. As will be described, it does this by surrounding, seizing, pulling, and positively jam locking the tool shank retention knob 28, in a springless manner limited only by the yield strength of the materials involved.

When the spindle is turning with a tool shank in place, driving key 29, which is firmly mounted on the spindle nose face 30, engages a mating driving notch in the tool shank flange and prevents rotational slip of the tapered tool shank in the spindle taper.

FIG. 2 is a functional block diagram of the principal systems and subsystems of the machining center. The block functions and their interconnections shown thereon by arrow lines will now be described.

Five principal systems are depicted, namely, the computer numeric control system, the work table system, the automatic pallet changer system, the main power spindle system, and the automatic tool changer system.

The computer numeric control system enables the machining center to operate with minimal human intervention by sending control signals to all of the other systems. The preparation of a program for its computer program subsystem has been described earlier, and is well known in the art. The machine sensors subsystem continuously reports the positions of all of the work table and spindle axes, as well as other significant data on the operating status of all systems and subsystems, as required by the computer. The computer compares all of this sensor data it receives with the desired programming, and effects all machine motions required for execution. The operator control subsystem is a manual machine turn-on, instruction giver, and program override, and also oversees machine lubrication.

The work table system has a table axis servo control subsystem which sets the proper instantaneous position for each of the possibly as many as four or more significant work table axes. The work clamping subsystem functions in coordination with the automatic pallet changer system, and also allows alternative manual set-up of the workpieces to be machined.

The automatic pallet changer system is optional. It operates with a reserve of workpieces that have been accurately mounted on changeable pallets. Then the work clamping subsystem is enabled to function more efficiently with regularized pallets rather than with irregular workpieces. Finished work can be removed from the pallets that are returned by the pallet changer, or taken directly from the work clamping subsystem in the case of a manual set-up.

The main power spindle system performs functions connected with cutting, burnishing, and measuring tools. Its tool coolant subsystem controls the flow of lubricating coolant ove the cutter and workpiece. The spindle axis servo control subsystem sets the proper instantaneous position for each of the possibly as many as three or more significant spindle axes. The spindle nose air blast cleaning system clears the spindle nose taper of dirt and machining debris to assure proper seating of tool shank tapers. The spindle motor drive subsystem rotates the spindle at the power levels and speeds allowed or required by the machining program and the characteristics of the workpiece material.

The tool retention subsystem of the main power spindle system is the location of the improved tool retention mechanism which will be described herein. The tool retention subsystem of the present invention positively locks tools mounted in tool shanks into the spindle to allow the development of the full rated spindle horsepower. It also functions in coordination with the the automatic tool changer system and the movements of its tool changer arm or arms.

The automatic tool changer system is an essential part of a machining center. It functions in coordination with a tool magazine subsystem, which has been manually stocked with tools mounted in tool shanks.

THE PREFERRED EMBODIMENT

Figure 3:
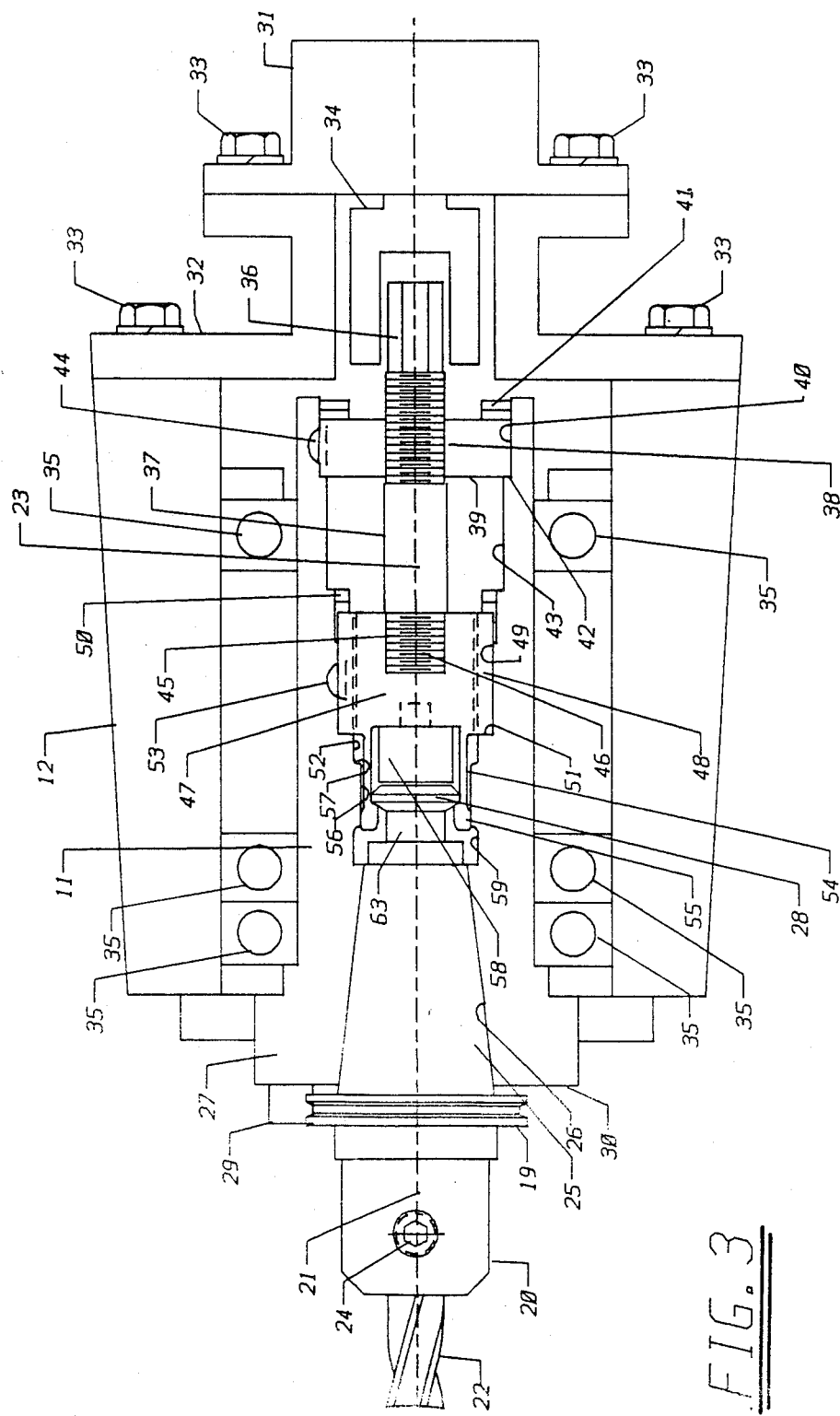
FIG. 3 illustrates the preferred embodiment of the core of the present invention.

Although FIG. 1A includes the preferred embodiment of the present invention with a tool positively locked in place, the enabling features of the invention are more clearly seen in a larger scale rendition, FIG. 3. The following discussion will proceed sequentially through the elements of the motor, rotary bolt actuator, and collet means of the preferred embodiment tool retention mechanism of FIG. 3.

The motor means 31 is a reversible, free-wheeling, impact wrench. The purposes of the selection of an impact wrench are: first, to drive the retention mechanism between its open position, where the automatic tool changer arm can remove and insert tool shanks, and its closed position, where an inserted shank is positively locked in place; and second, to provide shock or impulse tightening of certain threadable features of the invention which will be enumerated. Since impulse torque tightening functions efficiently against the moment of inertia of the spindle, there are no holding problems. Commercially available impact wrenches are powered pneumatically, hydraulically, or electrically. Since all three of these sources are usually present in machining centers, the designer has a choice. However, a compressed air leak does not have the potential for messy floor spillage like oil, while an electric motor may be the largest to install for a given power rating, and have the highest maintenance. Therefore, the pneumatic drive is recommended for the preferred embodiment, all other things being equal.

The impact wrench is secured by a sturdy motor mounting 32 and mounting bolts 33 to the stationary spindle housing 12. On receiving a selective actuation command from the machining center computer control of the automatic tool changer, the wrench delivers a succession of either clockwise or counterclockwise torque impulse shocks to an axial slip deep hexagonal driving socket 34. When the actuation command is removed, the free-wheeling feature of the impact wrench permits unrestrained bi-directional rotation of the socket as the main power spindle 11 is turned by its drive motor during machining operations. The spindle driving gears are not shown in the figure. The spindle is rotatably mounted in spindle bearings 35, some of which can resist the full thrust generated by all machining operations in both forward and rearward axial directions, as well as in all radial directions.

The deep driving socket is slidably connected to the mating hexagonal driving and 36 of the rotary bolt actuator 37. While the figure depicts a hexagonal type of sliding coupling, it will be recognized that many equivalent arrangements exist. This general type of open coupling not only integrates well with spindle systems of the removable cartridge type, but it confers the necessary freedom of axial movement for the rotary bolt actuator as the left-hand threading 38 of the bolt turns in the mating left-hand internal threading of a rigid spindle stator 39. The stator is held in the axial bore 40 of the spindle by axial restraint fastener means 41 that press the stator tightly against the square shoulder 42 formed at the intersection of bore 40 with the smaller spindle axial bore 43. The stator is secured against rotation in the bore by rotational restraint fastener means 44, which may be woodruff keys or the equivalent. The design of the stator must assure that it constitutes a fixed axially stationary reference to enable it to withstand the high pre-load tension that will be generated by the impact wrench action in jam locking certain threadable means which will be described.

The opposite right-hand threading 45 of the bolt's front end 46 turns in the mating right-hand internal threading of collet body 47, which is slidably mounted in collet axial constraint guide means 48. The collet guide means is held in the axial bore 49 of the spindle by axial restraint fastener means 50 that press the guide means tightly against the square shoulder 51 formed at the intersection of bore 49 with the smaller spindle axial bore 52. The guide means is secured against differential rotation in the bore by rotational restraint fastener means 53, which may be woodruff keys or the equivalent. The guide means contains internally broached longitudinal serrations which slidably mate with external longitudinal serrations on the outside cylinder of the collet body. Therefore, while the integral collet body 47, collet fingers 54, and collet finger terminal ends 55 are free to rotate with the spindle, they are constrained to only axial movement with respect to the spindle.

The collet body, fingers, and terminal ends are constructed from a single billet of high tensile ferroalloy. A plurality of fingers and terminal ends are created by turning an outside diameter encompassing the body, finger, and end outer shape. The piece is then bored to form the internal configuration of the fingers and terminal ends, with particular care in establishing the wall thickness of the fingers. The plurality of collet fingers is achieved by fine wire cutting of a number of minimally narrow radial slots into the portion of the collet formed by the thin wall and finger end sections. This procedure will result in the fingers being generally parallel to the spindle axis in their equilibrium position, yet capable of flexing radially outward, while at the same time possessing the very highest strength of which a collet is capable, resulting from maximizing the tensile cross section.

It is vital that the inside turned configuration of the finger terminal ends be constructed to not only surround and grasp, but also to conform with and intimately contact the shape of the tool shank retention knob 28, in their equilibrium positions. The flexing property will enable the finger terminal ends to pass over the outer circumference of the knob on insertion and removal of the tool shank 20. The knob conformation and contact property will enable the knob and collet fingers to be immobile when the high pre-load tension is applied by the impact wrench, provided the fingers and their terminal ends are also properly supported by the spindle bore design in the closed position.

Spindle axial bore 56 is provided and sized to permit a slip contact supporting fit with the major diameter of the collet finger terminal ends, thus precluding radial expansion of the terminal ends when the tool shank tapered section 25 is in intimate frictional contact with the tapered bore 26 of spindle nose 27.

The use in the preferred embodiment of opposite double threading, instead of single threading plus a thrust bearing, enables the impact wrench to go from the collet open position to the closed position with an angular rotation that is only half of the value required by the single threading. In addition, the collet achieves an axial linear velocity that is double the value provided by single threading for the same angular velocity of the impact wrench driving socket. This enables either positive clamping or unclamping of the retention knob to be easily accomplished within a second or less. Thus the present invention is as speedy as the ineffective conventional spring retention systems now employed.

Thus in the closed position the double opposing threads are jam locked up against the high pre-load tension applied to the knob. This arrangement in inherently self-compensating for thread wear.

In the open position, proper axial positioning of the finger terminal ends in order to permit the automatic tool changer arm to insert or withdraw a tool shank knob is accomplished by the collet body encountering the solid structural forward travel limit imposed by the square shoulder 57 formed at the intersection of axial bore 52 and smaller axial bore 56.

So as to positively break the taper contact seating of a tool shank that has been locked in place when the collet is returned from closed to open position, the knob is pushed out axially toward the spindle entrance by means of shank unseating extension 58. At the same time, the finger terminal ends enter the enlarged axial bore recess 59. The fingers maintain their equilibrium positions until the tool changer arm pulls the knob out axially, whereupon the fingers flex radially outward to enable passage of the terminal ends over the outer circumference of the knob as the tool shank is withdrawn.

It should be ooted that a failure of the automatic tool changer to deliver a knob into the open collet, while at the same time issuing a tool retention command to the impact motor, will not cause any problems for the present invention. The collet body will simply be drawn rearward, not grasping any knob, until the end of the left-hand threading 38 of the rotary bolt actuator is reached, and the unthreaded bolt section jams at the entrance to the left-hand threaded stator 39.

FIG. 4 is a series of four partially sectioned drawings of the preferred embodiment which depict graphically the three stages of tool shank entry into the open collet position, and the fourth stage of positive locking in the closed collet position.

In FIGS. 4A, B and C the rotary bolt actuator 37 is depicted at its extreme left-hand position in the drawings, where the forward travel of collet body 47 has been terminated in the open collet position by the travel limit shoulder 57.

FIG. 4A shows a tool shank 20 approaching the entrance to the spindle nose 27. The tool changer arm is not shown.

In FIG. 4B the tool shank retention knob 28 is just about to encounter the collet finger terminal ends 55.

The entry of the tool shank 20 has progressed in FIG. 4C to the point where the collet fingers 54 have flexed radially outward and are so held by the outer circumference of the tool retention knob 28. The terminal ends 55 have been pushed almost to the limiting outer diameter of the enlarged axial bore recess 59.

FIG. 4D depicts the tool shank 20 positively locked in the closed position of collet body 47. The rotary bolt actuator 37 has moved to the right in the drawing to its jam locked pre-load tension position.

The preferred embodiment has been built and statically tested successfully in a prototype employing a No. 40 taper. Only $1\frac{1}{2}$ turns of the doubled $\frac{1}{8}$ inch pitch threads of the rotary bolt actuator were required to engage or release the tool retention knob in less than one second. Well over 20,000 pounds of pre-load tension, or tool clamping force, were obtained momentarily. The limit was not tested for fear of destroying the only model that had been constructed. There was no observed deflection at 5,000 pounds, where most tests were run, due to tensile limits inherent in the volume of metal in the hollow neck of the particular retention knob that was employed.

The preferred embodiment is believed to be useful in machine tools lacking the full range of features generally associated with machining centers, as well as possess utility in other applications.

ALTERNATIVE COLLET ARRANGEMENT

FIG. 5 presents an optional collet construction which utilizes a set of hard steel locking balls 60 to perform the functions of the finger terminal ends in the preferred embodiment. The balls are contained in a plurality of radial holes 61 by means of a slight taper (which cannot be shown in the drawing) or by equivalent retaining means. The holes are drilled around the circumferential periphery of a collet knob-surrounding hollow cylindrical tube 62, which is made integral with the collet body 47. The inner diameter of the tube is approximately equal to the outer diameter of the tool shank knob so that the knob will have a tight sliding fit into the cylinder to prevent radial motion when tension is applied. The holes are generally aimed toward the connecting stem 63 of the tool shank retention knob 28, when the knob is in the closed position, which is illustrated in FIG. 5.

An enlarged axial bore recess 59, similar to that used in the preferred embodiment, enables the balls to pass over the outer circumference of the tool retention knob 28 on insertion and removal of the tool shank 20, which must be done in the open position.

When the rotary bolt actuator means 37 pulls the collet body 47 axially away from the spindle entrance, the balls are urged out of the recess into the open volume formed by the diameter of the connecting stem 63 and the diameter of the retention knob 28. Further motion of the collet body binds the balls into tight holding fits within the structurally binding close constraints of the geometry of the knob, the radial holes, and the spindle axial bore 56. This bore now performs the same function with respect to the balls that it did for the finger terminal ends in the preferred embodiment.

FIG. 6 presents the same stages of tool insertion and locking for the alternative arrangement that have been given for the preferred embodiment. Possible effects of gravity on the balls are not considered in rendering the figures.

In FIG. 6A the open position collet 47 is ready to receive the tool shank retention knob 28.

The knob has just encountered the balls 60 in FIG. 6B.

In FIG. 6C the balls 60 have been pushed by the outer circumference of the knob 28 almost to the limit allowed by the enlarged axial bore recess 59.

FIG. 6D depicts the closed position. It will be recognized that the collet knob-surrounding hollow cylindrical tube 62 is an integral construction which is intrinsically stronger than the fingers of the preferred embodiment, which are minimally wire cut from a similar structure, and also must be allowed room to flex outward. However, the balls do not receive the support given to the finger terminal ends in the preferred embodiment, which also keeps the fingers from distortion under the high pre-load tension. Instead, a ball always sits on single "points", which become deformed and cannot be readily supported. The balls are terribly subject to brinelling under such stress, and will require frequent replacement. Their use in the alternative arrangement makes it considerably inferior to the preferred embodiment, in this inventor's opinion, for machine tools of the highest capacity. The effectiveness of the design rests upon further significant developments in materials and metallurgy. However, it may have application in lower capacity machine tool service, or in other applications, and the design is such that the balls should be easy to replace.

I claim:

1. A positive locking tool shank retention mechanism, for use in a machine tool spindle having a female tapered entrance in its nose, fully compatible with the automatic tool changing systems of computer numeric controlled machining centers, and for other applications, with rapid shank engagement and release to allow quick changing of tools that are mounted in mating male tapered tool shanks having retention knobs, and featuring such positive axial tool retention force that said mechanism cannot be overcome by the severe axial counter forces that are generated by spiral cutting tools when operated at the full machine tool rated spindle horsepower, in order to raise machine tool productivity by eliminating the machine tool operator's problems involving taper unseating, vibration and chatter, damage to work and machines, tool loss, extra down time with added maintenance, and lowered operator safety, that are caused by said spiral cutting tools which universally generate sufficient axial forces to readily overcome the limited bias tool shank retention force of the current conventional standard of the industry belleville and other spring actuated tool shank retention systems when operated at a spindle driving power level considerably lower than the rated machine spindle horsepower, comprising:

collet means for
  (A) surrounding and seizing, in the open position of said collet means, one of said knobs presented into said spindle nose entrance within reach of said collet means, and for
  (B) pulling, into the closed position of said collet means, said attached tapered tool shank body to a tight positive seating in said spindle nose taper; and rotary bolt actuator means, including two threaded portions, one portion being threadably connected to the spindle and the other portion being threadably connected to said collet means, whereby rotation of said rotary bolt actuator means causes motion of said collet means with respect to said spindle, for threadable positive axial
  (A) bi-directional displacement of said collet means relative to and within said spindle between said open and closed positions, and for
  (B) jam locking of said rotary bolt actuator means under high pre-load axial tension in said closed position, and for
  (C) springless retention of said tool shank in said closed position, wherein said knob and attached tool shank body are held under said high pre-load axial tension within said spindle, and wherein said tension is supplied by the mechanical strain of the materials of the jam locked structure of said mechanism and said spindle supporting said tension and limited only by the yield strength of said materials; and motor means for
  (A) selective bi-directional driving of said rotary actuator means between said open and closed positions, and for
  (B) providing said threadable jam locking under said high pre-load tension.

2. A tool shank retention mechanism according to claim 1 wherein said rotary bolt actuator means further comprises opposite double threading, wherein one end of said rotary bolt actuator means is threaded to said collet means and the other end is oppositely threaded to a sturdy springless structure that constitutes an axially stationary reference fixed within said spindle to withstand said threadable jam locking under said high pre-load tension, and wherein said rotary bolt actuator means requires an angular rotation that is only half of the value required by single threading for the same distance of axial linear displacement of said collet means, and wherein said rotary bolt actuator means provides an axial linear velocity of motion of said collet means that is double the value provided by single threading for the same angular velocity of said rotary bolt actuator means.

3. A tool shank retention mechanism according to claim 2 wherein said collet means further comprises:
collet constraint means for preventing differential rotary motion between said collet means and said spindle but only allowing relative motion of said collet with respect to said spindle in the central axial directions; and collet grasping means for structurally surrounding one of said knobs that has been proximately presented through said spindle nose entrance into the open bore of said spindle in said open position; and collet locking means for rigidly securing said presented and surrounded and grasped knob as said collet means are pulled axially away from said entrance toward said closed position by said rotary bolt actuator means.

4. A tool shank retention mechanism according to claim 3 wherein said collet grasping means further comprises a plurality of longitudinal fingers generally parallel to the spindle axis in their equilibrium positions, and capable of flexing radially outward to non-parallel non-equilibrium positions to enable passage of the ends of said fingers over the outer circumference of said knob on insertion and removal of said tool shank in said open position; and wherein said collet locking means further comprises enlarged terminal locking ends on said fingers, which are shaped to reach over, conformably mate with, and securely grip said knob when said flexible fingers are in their equilibrium positions, and wherein said terminal ends and said knob have identically shaped areas of holding contact in said closed position.

5. A tool shank retention mechanism according to claim 4 wherein said collet locking means further comprises a reces cut into the bore of said spindle to enable said enlarged terminal ends of said fingers to flex radially outward and pass over the outer circumference of said knob on insertion and removal of said tool shank only in said open position, and wherein said enlarged terminal ends fit into the open volume formed by the knob and the knob stem in said equilibrium positions when said rotary bolt actuator means pulls said collet means axially away from said entrance, and thereby moves said locking terminal ends away from the region of said recess into tight holding fits within the structural constraints imposed on said locking terminal ends by said spindle bore and said knob in said closed position, in order to reinforce the structural holding integrity of said collet grasping means by blocking flexure of said fingers in said closed position, and allowing flexure only in said open position.

6. A tool shank retention mechanism according to claim 5 wherein said collet means further comprises structural limit means for limiting the forward axial travel of said collet means and wherein said collet means is thereby positioned in its open position to permit the insertion or withdrawal of a tool shank knob.

7. A tool shank retention mechanism according to claim 6 wherein said collet means further comprises unseating means for positively breaking the taper contact seating of a tool shank that had been locked in place, by displacing said knob axially within said spindle toward said entrance, when said collet means is returned to said open position from said closed position by said rotary bolt actuator means.

8. A tool shank retention mechanism according to claim 3 wherein said collet grasping means further comprises a plurality of radial holes around the periphery of its knob-surrounding structure, and wherein said holes are generally aimed toward the connecting stem of said knob in said closed position; and said collet locking means further comprises a plurality of locking balls, with each ball retained in a slight taper or by equivalent retaining means in one of said radial holes, and wherein a recess cut into the bore of said spindle enables said balls to pass over the outer circumference of said knob on insertion and removal of said tool shank in said open position, and wherein said balls are urged into the open volume formed by the stem diameter and the knob diameter when said rotary bolt actuator means pulls the collet means axially way from said entrance, and thereby moves the locking balls out of said recess and binds them into tight holding fits within the structurally binding close tolerance constraints imposed on said balls by said spindle bore, said radial holes, and said knob in said closed position.

9. A tool shank retention mechanism according to claim 8 wherein said collet means further comprises structural limit means for limiting the forward axial travel of said collet means and wherein said collet means is thereby positioned in its open position to permit the insertion or withdrawal of a tool shank knob.

10. A tool shank retention mechanism according to claim 9 wherein said collet means further comprises unseating means for positively breaking the taper contact seating of a tool shank that had been locked in place, by displacing said knob axially within said spindle toward said entrance, when said collet means is returned to said open position from said closed position by said rotary bolt actuator means.

11. A tool shank retention mechanism according to claims 1 or 2 or 3 or 4 or 5 or 6 or 7 or 8 or 9 or 10 wherein said motor means further comprises free wheeling means for free shaft rotation when said motor means are not powered for selective bi-directional driving of said rotary bolt actuator means.

12. A tool shank retention mechanism according to claim 11 wherein said motor means further comprises a reversible free wheeling impact wrench that delivers repetitive sharp impulse shocks in the selected direction of rotation.

13. A tool shank retention mechanism according to claim 12 wherein said motor means further comprises means for rotary coupling with axial slip between said impact wrench and said rotary bolt actuator means and wherein said impact wrench is mounted on the stationary frame of said machine tool.

14. A machine tool, comprising:

computer control means for numeric control of the machine tool; and work table means for holding a workpiece to be machined; and automatic tool changer means for exchanging tools mounted in tool shanks; and main power spindle means for rotating said tools mounted in said tool shanks, comprising a tool shank retention mechanism, further comprising:

collet means for
  (A) surrounding and seizing, in the open position of said collet means, one of said knobs presented into said spindle nose entrance within reach of said collet means, and for
  (B) pulling, into the closed position of said collet means, said attached tapered tool shank body to a tight positive seating in said spindle nose taper; and rotary bolt actuator means, including two threaded portions, one portion being threadably connected to the spindle and the other portion being threadably connected to said collet means, whereby roation of said rotary bolt actuator means causes motion of said collect means with respect to said spindle, for threadable positive axial
  (A) bi-directional displacement of said collet means relative to and within said spindle between said open and closed positions, and for
  (B) jam locking of said rotary bolt actuator means under high pre-load axial tension in said closed position, and for
  (C) springless retention of said tool shank in said closed position, wherein said knob and attached tool shank body are held under said high pre-load axial tension within said spindle, and wherein said tension is supplied by the mechanical strain of the materials of the jam locked structure of said mechanism and said spindle supporting said tension and limited only by the yield strength of said materials; and motor means for
  (A) selective bi-directional driving of said rotary actuator means between said open and closed positions, and for
  (B) providing said threadable jam locking under said high pre-load tension.

15. A machine tool according to claim 14 wherein said rotary bolt actuator means further comprises opposite double threading, wherein one end of said rotary bolt actuator means is threaded to said collet means and the other end is oppositely threaded to a sturdy springless structure that constitutes an axially stationary reference fixed within said spindle to withstand said threadable jam locking under said high pre-load tension, and wherein said rotary bolt actuator means requires an angular rotation that is only half of the value required by single threading for the same distance of axial linear displacement of said collet means, and wherein said rotary bolt actuator means provides an axial linear velocity of motion of said collet means that is double the value provided by single threading for the same angular velocity of said rotary bolt actuator means.

16. A machine tool according to claim 15 wherein said collet means further comprises:
collet constraint means for preventing differential rotary motion between said collet means and said spindle but only allowing relative motion of said collet with respect to said spindle in the central axial directions; and
collet grasping means for structurally surrounding one of said knobs that has been proximately presented through said spindle nose entrance into the open bore of said spindle in said open position; and
collet locking means for rigidly securing said presented and surrounded and grasped knob as said collet means are pulled axially away from said entrance toward said closed position by said rotary bolt actuator means.

17. A machine tool according to claim 16 wherein said
collet grasping means further comprises a plurality of longitudinal fingers generally parallel to the spindle axis in their equilibrium positions, and capable of flexing radially outward to non-parallel non-equilibrium positions to enable passage of the ends of said fingers over the outer circumference of said knob on insertion and removal of said tool shank in said open position; and wherein said
collet locking means further comprises enlarged terminal locking ends on said fingers, which are shaped to reach over, conformably mate with, and securely grip said knob when said flexible fingers are in their equilibrium positions, and wherein said terminal ends and said knob have identically shaped areas of holding contact in said closed position.

18. A machine tool according to claim 17 wherein said collet locking means further comprises a recess cut into the bore of said spindle to enable said enlarged terminal ends of said fingers to flex radially outward and pass over the outer circumference of said knob on insertion and removal of said tool shank only in said open position, and wherein said enlarged terminal ends fit into the open volume formed by the knob and the knob stem in said equilibrium positions when said rotary bolt actuator means pulls said collet means axially away from said entrance, and thereby moves said locking terminal ends away from the region of said recess into tight holding fits within the structural constraints imposed on said locking terminal ends by said spindle bore and said knob in said closed position, in order to reinforce the structural holding integrity of said collet grasping means by blocking flexure of said fingers in said closed position, and allowing flexure only in said open position.

19. A machine tool according to claim 18 wherein said collet means further comprises structural limit means for limiting the forward axial travel of said collet means and wherein said collet means is thereby positioned in its open position to permit the insertion or withdrawal of a tool shank knob.

20. A machine tool according to claim 19 wherein said collet means further comprises unseating means for positively breaking the taper contact seating of a tool shank that had been locked in place, by displacing said knob axially within said spindle toward said entrance, when said collet means is returned to said open position from said closed position by said rotary bolt actuator means.

21. A machine tool according to claims 14 or 15 or 16 or 17 or 18 or 19 or 20 wherein said motor means further comprises free wheeling means for free shaft rotation when said motor means are not powered for selective bi-directional driving of said rotary bolt actuator means.

22. A machine tool according to claim 21 wherein said motor means further comprises a reversible free wheeling impact wrench that delivers repetitive sharp impulse shocks in the selected direction of rotation.

23. A machine tool according to claim 22 wherein said motor means further comprises means for rotary coupling with axial slip between said impact wrench and said rotary bolt actuator means and wherein said impact wrench is mounted on the stationary frame of said machine tool.

* * * * *